United States Patent [19]

Shreve et al.

[11] Patent Number: 5,410,675
[45] Date of Patent: Apr. 25, 1995

[54] METHOD OF CONFORMING INPUT DATA TO AN OUTPUT DATA STRUCTURE AND ENGINE FOR ACCOMPLISHING SAME

[75] Inventors: Lisa M. Shreve, 18790 Autumn La., Southfield, Mich. 48076; Peter D. Pruyne, Chicago, Ill.

[73] Assignee: Lisa M. Shreve, Southfield, Mich.

[21] Appl. No.: 122,700

[22] Filed: Sep. 17, 1993

Related U.S. Application Data

[63] Continuation of Ser. No. 49,620, Apr. 19, 1993, abandoned, which is a continuation of Ser. No. 396,280, Aug. 21, 1989, abandoned.

[51] Int. Cl.⁶ .......................... G06F 3/00; G06F 5/00; G06F 15/40
[52] U.S. Cl. .................................... 395/500; 364/225; 364/239.3; 364/240.8; 364/280.4; 364/281.1; 364/DIG. 1
[58] Field of Search ................ 395/500, 600; 364/401, 364/408

[56] References Cited

U.S. PATENT DOCUMENTS

| | | | |
|---|---|---|---|
| 4,156,910 | 5/1979 | Barton et al. | 364/200 |
| 4,485,439 | 11/1984 | Rothstein | 395/325 |
| 4,555,771 | 11/1985 | Hayashi | 364/900 |
| 4,631,666 | 12/1986 | Harris et al. | 364/200 |
| 4,680,705 | 7/1987 | Shu | 364/300 |
| 4,714,995 | 12/1987 | Materna et al. | 364/200 |
| 4,951,196 | 8/1990 | Jackson | 364/401 |
| 5,045,994 | 9/1991 | Belfer et al. | 364/200 |
| 5,058,000 | 10/1991 | Cox et al. | 395/600 |
| 5,060,140 | 10/1991 | Brown et al. | 395/325 |
| 5,123,103 | 6/1992 | Ohtaki et al. | 395/600 |

Primary Examiner—Pakshotam S. Lall
Assistant Examiner—Ayni Mohamed
Attorney, Agent, or Firm—Brooks & Kushman

[57] ABSTRACT

A method for restructuring input data having a prespecified input data structure with a data management engine, such as a translation engine, which is dynamically configured by the input data to conform the input data to an output data structure. When the data management engine takes the form of a translation engine, capability exists to translate data to and from various electronic data interchange (EDI) formats. Because the data management engine is dynamically configured by the input data, the translation process is independent of the specific details of EDI protocol and capable of coordinating multiple data sources/destinations without requiring any recoding of the engine. Initially, data protocol utilized in the data interchange system is ascertained. Then, the protocol data related to the data protocol and protocol processing instruction data is initialized. Next, the initialized protocol data and the initialized protocol instruction processing data is linked to a core program which takes the form of a translator in the EDI system to form the translation engine. Finally, the input data is converted into an output data structure with the translation engine wherein the input data dynamically configures the translation engine.

13 Claims, 4 Drawing Sheets

METHOD OF CONFORMING INPUT DATA TO AN OUTPUT DATA STRUCTURE AND ENGINE FOR ACCOMPLISHING SAME

This is a continuation of application Ser. No. 08/049,620, now abandoned, filed on Apr. 19, 1993, which is a continuation of application Ser. No. 07/396,280, now abandoned, filed on Aug. 21, 1989.

TECHNICAL FIELD

This invention relates to method and apparatus for structuring input data into an output data structure, structure in an electronic information processing system which has a data interchange system.

BACKGROUND ART

When companies first started acquiring their own computer systems, it was an obvious step to customize their systems to the type of business they were involved in. Thus, grocery companies had a data structure suitable for storing grocery inventories, whereas car companies had a structure suitable for storing parts and layout.

At the emergence of the paperless office it has become increasingly important that a large variety of companies be able to communicate with each other. Since their data structures were incompatible, the field of electronic data interchange (EDI) developed.

EDI involves exchange of information between computer systems, thus eliminating the need for human intervention for routine document exchanges. The protocol in such a system is a complex hierarchical structure representing basic business documents with multiple industries and multiple nations involved in the specification and usage of the documents. Due to multiple usages of a single document (field content sensitivity) and protocol mandated validation/editing requirements, each update to the protocol (quarterly to annually) requires code modifications to existing translation products.

In essence, EDI is achieved by having a company which is sending information translated into a generic format (such as ANSI X.12) and the company receiving it translates from that format into the in-house data structure. Thus, information can be sent directly between computers with incompatible data structures.

Existing translation products are increasingly required to integrate into an existing applications environment which requires extensive control over the ability to accept and disseminate data from more than a single system.

In the art, table driven translators are considered state of the art. One such product is offered by Supply Tech, Inc. of Southfield, Michigan. This translator includes X.12/TDCC transaction sets that uses table for both protocol data as well as a flat file for interfacing to applications.

The Chrysler Corporation of Highland Park, Michigan utilizes a fast batch application interface which requires custom programming for interactive EDI i.e. passing data to an application and awaiting a response. This is a custom developed solution.

Another translation product is offered by Merit Systems, Inc. of Troy, Michigan. This product utilizes the translation capability of Release Management Systems, Inc. of Livonia, Michigan and offers IBM host connectivity through use of Tandem Computers 3270 capabilities, i.e. passing and collecting EDI data through use of programmable terminal interface capabilities.

The above-noted software product as well as all of the known software products are limited in the EDI translation capabilities, such as (1) limited protocol adaptability; (2) custom programming required for field content sensitivity processing; and (3) interface capabilities limited to custom solutions.

SUMMARY OF THE INVENTION

An object of the present invention is to provide a method and apparatus for structuring input data into an output data structure in an information processing system wherein change in the data protocol utilized in the system does not necessitate programming change.

Another object of the present invention is to provide a method and apparatus for restructuring input data into an output data structure in an electronic interchange system wherein the method and apparatus are EDI protocol independent and are flexible in application interface capability.

Yet still another object of the invention is to provide a method and apparatus for restructuring input data into output data structure in an electronic information processing system wherein the input data dynamically configures a data management engine utilized for converting the input data into the output data structure.

In carrying out the above objects and other objects of the present invention, a method is provided for conforming input data into the output data structure in an electronic information processing system including a core program where input and output data structures are prespecified. The method comprises the steps of ascertaining in the system the data protocol to be utilized in the system. The method also comprises the steps of initializing in the system protocol data related to the data protocol and protocol processing instruction data.

Next, the initialized protocol data and the initialized protocol instruction processing data is linked in the system to the core program to form a data management engine. Finally, input data is converted into the output data structure with the data management engine, the input data dynamically configuring the data management engine.

In one embodiment, the electronic information processing system in an electronic data interchange system in the core program is a translator. The initialized protocol data and the initialized protocol instruction processing data are linked to the translator to form a translation engine. With the translation engine the input data is translated into the output data structure wherein the input data dynamically configures the translation engine.

Preferably, the step of initializing includes the step of generating a protocol framework, the protocol data including at least one layer element having descriptions. Also preferably, the step of initializing includes the step of allocating memory for a table of each of the layer elements. Also preferably, at least one of the layer elements has corresponding behaviors and wherein the step of initializing includes the allocating memory or table for each of the layer elements and the corresponding behaviors.

The advantages accruing to the method and apparatus of the present invention are numerous. Because the method and apparatus are data-driven, the core program or translator is relatively small and can read instructions from a storage mechanism in order to learn its job. In this way, each time an update for generic format or EDI protocol, such as ANSI X.12 is released, there is no need to modify the method and apparatus of the present invention since switching translation templates is simply a matter of reading a different data file.

A further object of this invention is to produce EDI information exchange among heterogeneous distributed systems (both intra-organization and interorganization) and incidentally producing EDI translation capability that is EDI protocol independent, capable of being updated without program changes and flexible in application interface capability.

These objectives are met through the establishment of a conceptual model providing a logical framework for approaching the program. This conceptual model involves the establishment of logical layers within the OSI application layer, as follows: included within the data model layer are physical database structures as well as transient data structures required for processing. At the processing logic layer are the information processing components required for editing, formatting, manipulating, extracting, etc., of the data represented via the data models. Finally, the views, reports and EDI layers are representative examples of forms by which data enters and leaves the system. Thus, information processing is a function of the unique combination of the view layer (screens, reports, EDI, etc.), the data model(s), and the processing instructions. As is characterized above, EDI in this view, once layered with the data model, is another view (input/output) on the system, although requiring additional processing steps for making the transformation from the EDI universal representation to the data model internal representation.

The above advantages and features of the present invention are readily apparent from the following detailed description when taken in connection with the accompanying drawings.

BEST MODE FOR CARRYING OUT THE INVENTION

Figures 1, 2, 8:
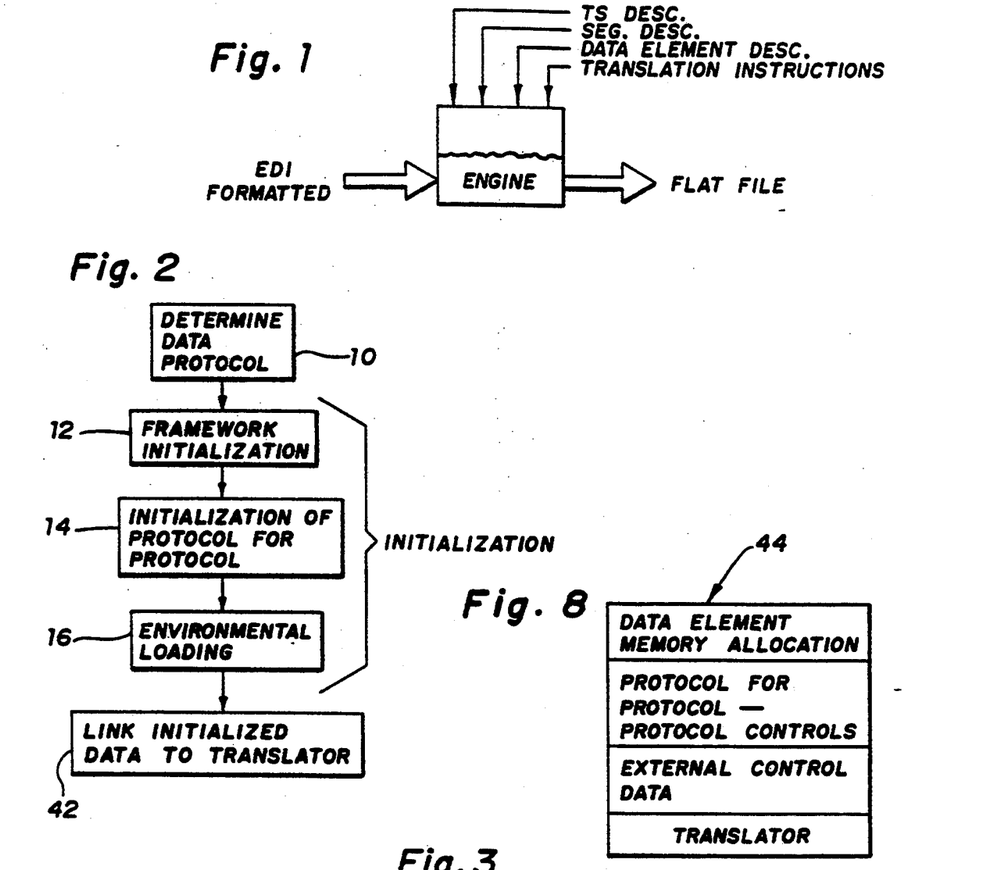
FIG. 1 illustrates an example of the present invention wherein an EDI formatted input file is translated to an application interface formatted file.
FIG. 2 is a generalized block diagram flow chart of a portion of the method of the present invention.
FIG. 8 is a block diagram illustrating the resulting structure after performing the step of the fourth block of FIG. 2.

Referring now to the drawing figures, there is illustrated in FIG. 1 an example of the present method and apparatus for translating an EDI formatted input file to an application interface formatted file such as a flat file. However, it is to be understood that the method and apparatus of the present invention are not limited to translating input data into an output data structure, such as is illustrated in FIG. 1 in an electronic data interchange system. Rather, the method and apparatus of the present invention can be utilized in an electronic information processing system, including a core program, wherein the resulting engine can be referred to as a data management engine for converting the input data into the output data structure. An example of such an application is where data bases having incompatible formats are sought to be used in a single system.

In general, the method and apparatus of the present invention are completely data driven by employing X-data in its initialization process for definitions and memory allocations, as well as text data for environmental data associating proper data locations to trading partners' specific idiosyncracies. Furthermore, the method and apparatus of the present invention utilize text data instructions for interpretation and processing of data (protocol and applications interface) at the segment and transaction set levels.

In this way the method and apparatus improves operating efficiency through a technique utilizing the format of the protocol itself as a format for the instructions to the engine. In this way the engine acts as a protocol interpreter in conjunction with the EDI translation process.

Also, given a complete data description of an EDI protocol (ANSI X.12 base, ODETTE or EDIFACT) environmental data qualifying data locations (trading partners specific data), and formatted text description of protocol validation and translation steps, the invention performs the translation to/from EDI formats to/from one or more application interface files.

As illustrated in FIG. 1, the translation process occurs in one direction to thereby produce an application interface file from an EDI formatted file. However, it is to be understood that actual translation process can occur in the opposite direction to produce an EDI formatted file from an application interface file.

When utilizing the invention in a product data interchange system, no major logic functions are involved regardless of whether the translation process is to or from EDI formatted data files.

As indicated in FIG. 2 at block 10, the first major logic function is to determine the specific EDI protocol, such as X.12/TDCC, ODETTE or EDIFACT or proper version thereof. Other ways for making this determination including file naming conventions, a command line parameter or a data content of the file itself.

However, once this determination is made, the second major logic function, the initialization process of blocks 12, 14 and 16 is performed. In the initialization process actually a protocol framework is initialized, as indicated by block 12. The framework represents the primitive building blocks of the protocol, such as data elements, segments, transaction sets, transaction behaviors, etc. as described hereinbelow for ANSI X.12.

ED—ELEMENT DESCRIPTION

—used to store all information about a data element.

An ED is referenced by number, called it's ID, up to four digits, also called an EID.

An ED has a name, a character string up to 64 characters long. This name is not used by the translator.

Two FIELDS give the minimum and maximum length for the element. Element lengths may be up to 9999.

A TYPE FIELD can have the following valves: AN (alphanumeric), ID (identifier), DT (date), TM (time), R (Decimal), and N (numeric).

For type N (numeric) a FIELD is used to give the position of the decimal.

For type ID (identifier), a pointer to an IDT is used, if absent any ID will be valid.

EDT—ELEMENT DESCRIPTION TABLE

—used to store a group of ED's.

An EDT has a name, a string of up to 64 characters. This name is not used by the translator.

A MAXIMUM FIELD holds the size of the array of ED pointers.

A COUNT FIELD holds the actual number of ED's in the EDT.

The ED's in an EDT are sorted by the ED ID FIELD.

SD—SEGMENT DESCRIPTION

—used to store a segment description.

ID—a string, the ID of the segment, also called a SID. From 1 to 16 characters.

NAME—a stating, descriptive name of segment, 1 to 64 characters.

CNT—the number of data elements in a segment, 1 to 32.

SDE—an array of pointers to SDE's.

B—a pointer to a behavior to validate the segment.

SDE—SEGMENT DESCRIPTION ELEMENT

—used to hold information about a single element in a segment.

ID—the number of the element.

ED—a pointer to the description of the element.

TYPE—describes the usage of the element in the segment. Currently supported are the following:
  MAND—must be present
  COND—presence dependent on other elements
  OPT—optional usage.

SDT—SEGMENT DESCRIPTION TABLE

—used to store a group of segment descriptions.

NAME—a string, up to 64 characters, The name is not used by the translator.

MAX—the size of the array of pointers to SD's.

CNT—the number of SD's in the SDT.

SD—an array of pointers to SD's.

T—TRANSACTION

—used to hold information related to a single segment in a transaction set.

ID—string, the ED of the segment.

SD—a pointer to the appropriate SD.

TYPE—describes the usage within the transaction set. One of the following:
  MAND—must be present
  OPT—presence is optional
  FLOAT—optional and variable position
  MAX—the limit for repetitive segment occurrence.
  LSPAN—the number of segments, including this one, making up a loop.
  LMAX—the number of times a loop may be repeated.

TS—TRANSACTION SET

—used to hold the transactions on a TS.

NAME—string, the name of the TS. not used by the translator

ID—The TS number.

MAX—Size of the array of T pointers.

CNT—The number of transactions in the TS.

T—The array of pointers to T's.

TB—TRANSITION BEHAVIOR

Used to hold a pair of behaviors to be associated with a transaction. One is used if the segment is present, another if it is absent.

ID—string, the segment/transaction ID.

PB—A pointer to the "present" behavior.

AB—A pointer to the absent behavior.

TBS—TRANSACTION BEHAVIOR SET

Used to hold a group of related transaction behaviors.

NAME—String, the name of this TBS not used by translator.

NUM—The number of the TS this TBS is used with.

MAX—The size of the array of pointers to TB's.

CNT—The number of TB's in the TBS.

TB—The array of TB pointers.

DTB—A pointer to a TB to be used for transactions without a matching TB.

As previously mentioned, during the initialization process, a protocol framework is generated which has multiple layer elements having descriptions. A first layer of protocol, as described above, are data elements. As indicated in FIG. 3, descriptions for each data elements is read and memory is allocated for each data element comprising that layer as indicated at block 18 of FIG. 3.

Figure 3:
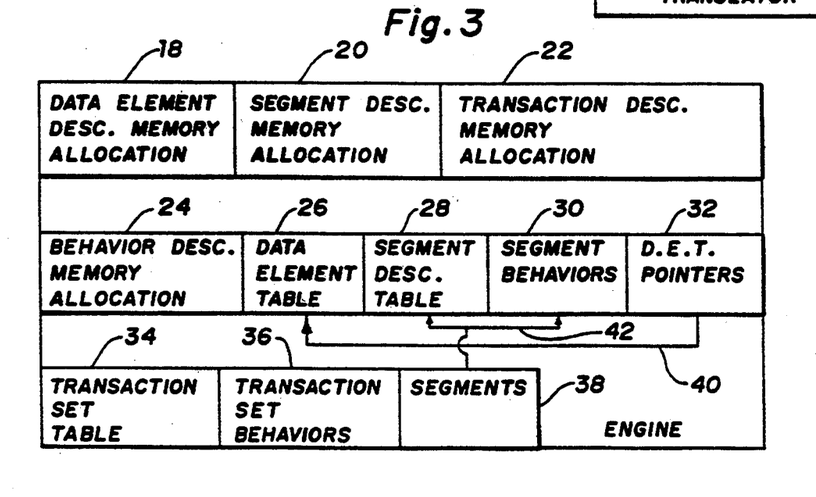
FIG. 3 is a table illustrating a protocol framework and data tables formed by the first three blocks of FIG. 2.

In like fashion, a second layer of protocol segment descriptions are read in memory as allocated for by segment descriptions as allocated at block 20 of FIG. 3. The memory allocation process is repeated for other protocol building blocks, such as transaction descriptors and behavior descriptions, as indicated at blocks 22 and 24 of FIG. 3.

Figure 4A:
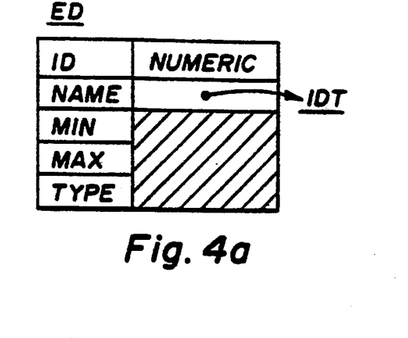
FIG. 4A is a table entitled ED (element description) which is utilized to store information about a data element.
Figure 4B:
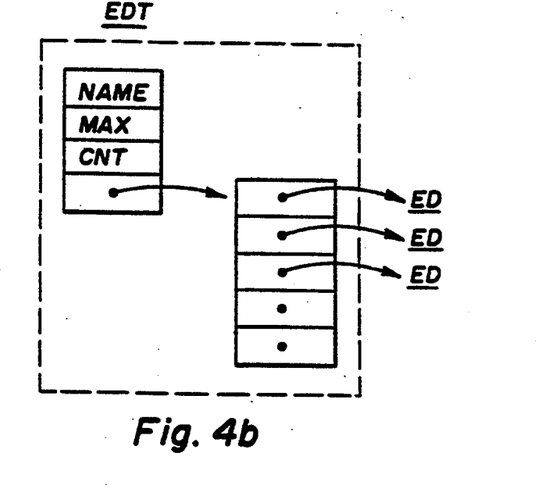
FIG. 4B is a table entitled EDT utilized to store a group of element descriptions.
Figure 5A:
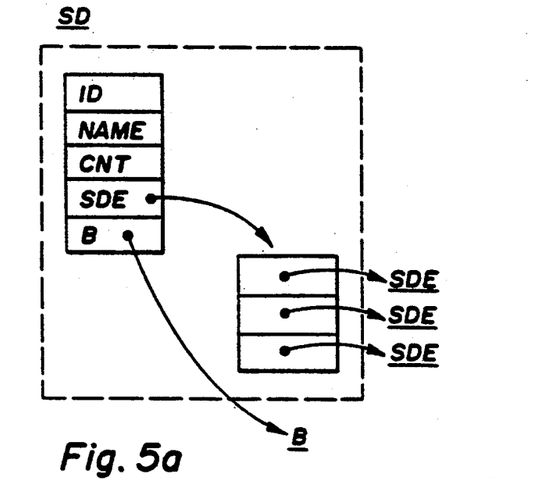
FIG. 5A is a table entitled SD utilized to store a segment description.
Figure 5B:
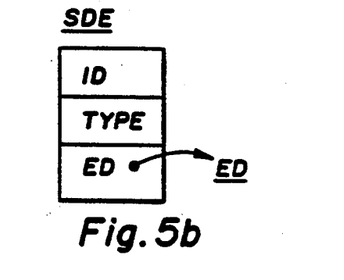
FIG. 5B is a table entitled SDE (segment description element) utilized to hold information about a single element in a segment.
Figure 5C:
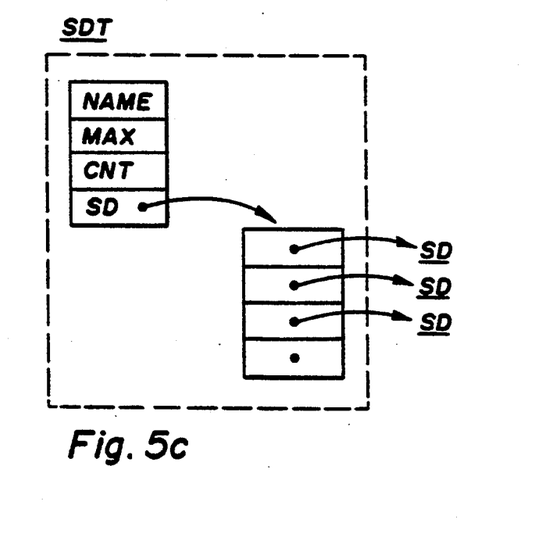
FIG. 5C is a table entitled SDT (segment description table) utilized to store a group of segment descriptions.
Figure 6A:
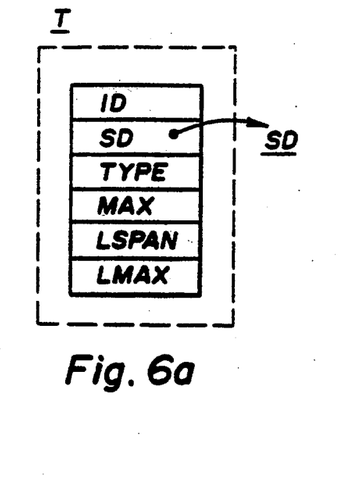
FIG. 6A is a table entitled T (transaction) utilized to hold information related to a single segment in a transaction set (document)
Figure 6B:
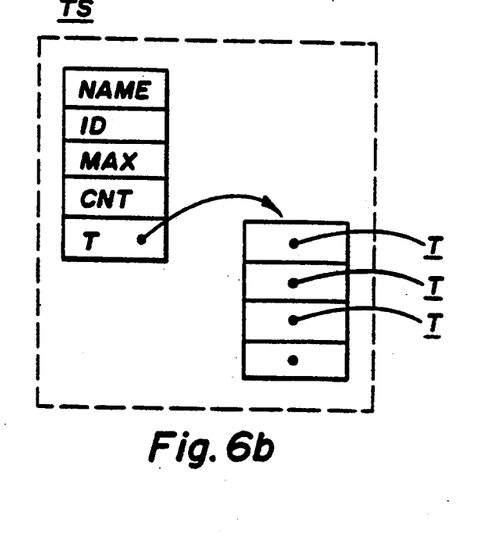
FIG. 6B is a table entitled TS (transaction set) utilized to hold the transactions in a transaction set.
Figure 7A:
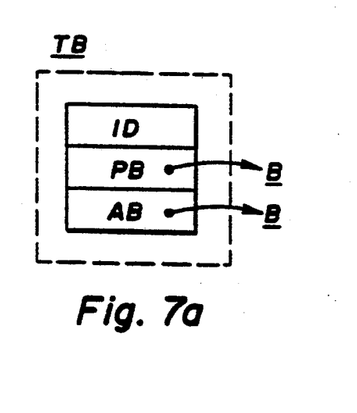
FIG. 7A is a table entitled TB (transaction behavior) utilized to hold a pair of behaviors to be associated with the transaction.
Figure 7B:
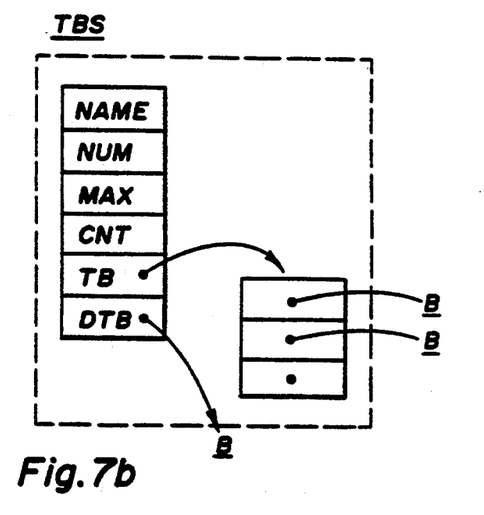
FIG. 7B is a table entitled TBS (transaction behavior set) utilized to hold a group of related transaction behaviors.

As previously mentioned, a typical element description is illustrated in FIG. 4A, a typical element description table is illustrated in FIG. 4B, a typical segment description is illustrated in FIG. 5A, a typical segment description element is illustrated in FIG. 5B, a typical segment description table is illustrated in FIG. 5C, a typical transaction segment is illustrated in FIG. 6A, a typical transaction set is illustrated in FIG. 6B, a typical transaction behavior is illustrated in FIG. 7A, a typical transaction behavior set is illustrated in FIG. 7B.

Referring now to FIG. 2, the next step of the initialization process indicated by block 14 can construct a protocol for the protocol. This process involves the allocation of memory tables for each of the protocol building blocks allocated during the framework initialization step of block 12. In this step, memory is allocated for tables of protocol layer elements and corresponding behaviors as indicated by blocks 26 through 38.

The last step of the initialization process is indicated at block 16 and requires the loading of a first set of control data from text file instructions. The first set of control data allocates and associates the control protocol to the protocol for the protocol as indicated by lines 40 and 42. Then the control files in the form of a control protocol are interpreted to link and combine the internal data structures to external data sources.

Having completed these steps, the resulting data structure with knowledge of the external data sources is attached to the translation logic or intelligence as indicated by block 42 of FIG. 2 to form the resulting data management or translator engine, as generally indicated at 44 in FIG. 8. The translator engine 44 is capable of interpreting an EDI document performing protocol editing and executing translation directives.

As previously mentioned, external control data of the translator engine 44 associates non-protocol specifics i.e. data files containing protocol text, flat file, application interface locations/names, trading partner parameters etc.

In order to perform an actual translation or conversion of input data into an output data structure with the resulting translator engine 44, the identity of the trading partner's industry may be required. This method for making this determination is configurable through the environmental data of the control protocol in FIGS. 3 and 8. This determination can be made from either file name and conventions, command line parameters or data content.

Figure 9:
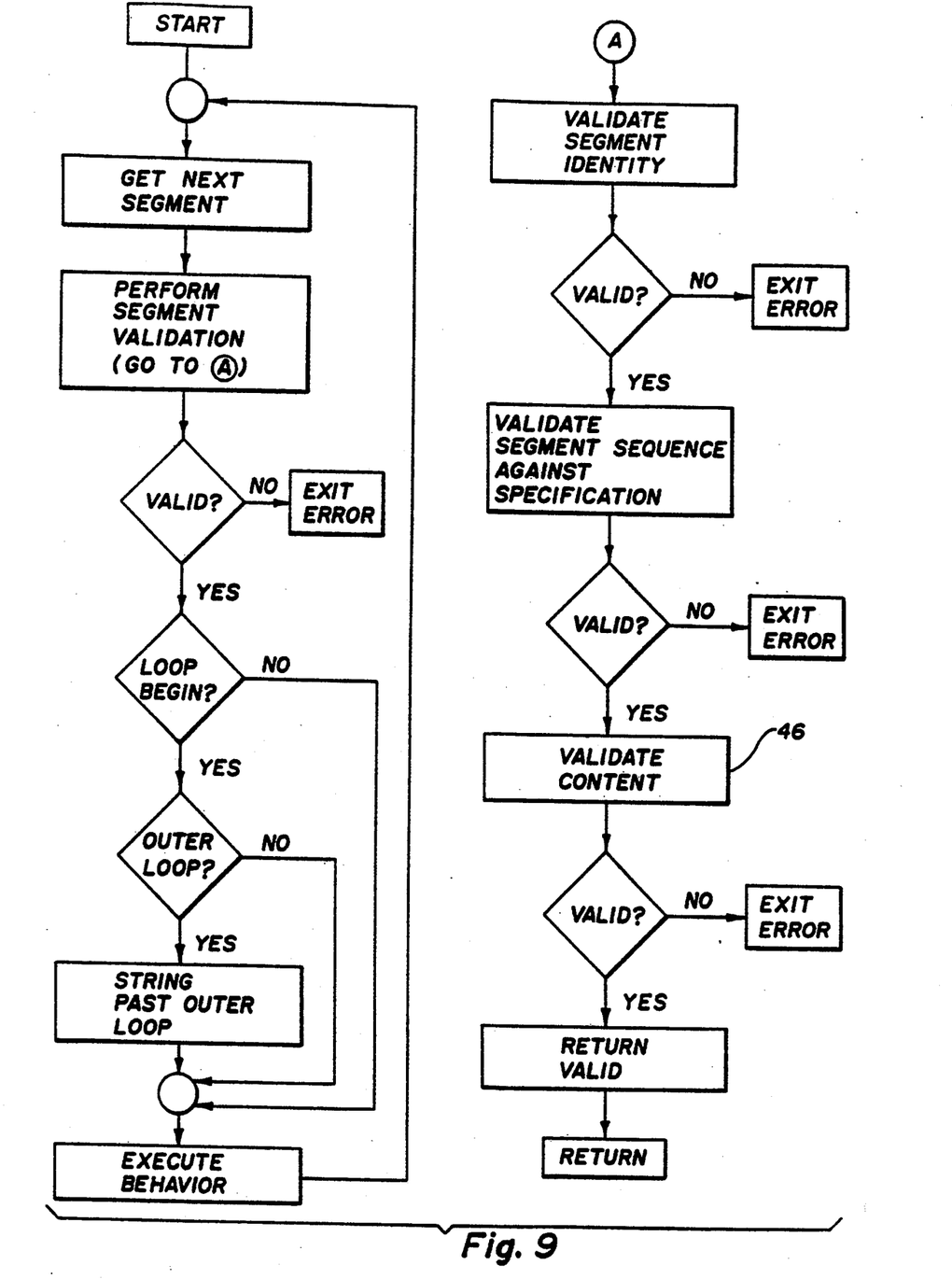
FIG. 9 is a flowchart illustrating the project performed by the engine in processing a translation including the details of the validation logic.

Once this determination is made to industry and trading partner specific code value and interpretation logic is linked to a particular document. As the translation process follows the logic detailed in FIG. 9 wherein two simultaneous EDI transactions are in use. One is the actual EDI specification for the document and the second is the specification for the documents specific translation \ validation \ processing instructions.

In general, as the EDI formatted document is processed (either constructed or decomposed) the translator engine 44 relies on the EDI specification file generate \ interpret EDI formatted documents and the translation \ validation \ processing instructions for linking \ processing application interface data to the specification.

Therefore, the generated EDI formatted document for one or more application interfaces sources the translator engine 44 utilizes the EDI specification for that document (for that trading partner) as a guide for content once the document and trading partner are determined. The translator engine 44 also utilizes the translation/validation instructions for action or behavior on how to achieve and manipulate interface data to meet the specification. Conversely, in order to convert an EDI formatted document into an application interface format (and perform protocol validation) the document data is processed against the EDI specification and formatted into interface data according to the translation/validation instruction document.

What follows now is an example of a typical element descriptions, segment descriptions, transaction set, transaction behaviors with an input example and a corresponding output.

| Element Descriptions | | | |
|---|---|---|---|
| Number | Title | Type | Min/Max |
| 100 | Purchase order number | AN | 05/05 |
| 101 | Contract number | NO | 04/04 |
| 102 | Contract date | DT | 06/06 |
| 124 | Note | AN | 01/40 |
| 137 | Part number | NO | 07/07 |
| 150 | Quantity | NO | 01/03 |
| 245 | Street address | AN | 01/20 |
| 246 | City | AN | 01/20 |
| 247 | State | ID | 02/02 |
| 248 | Zip Code | NO | 05/05 |
| 311 | Name | AN | 01/30 |
| 326 | Phone | NO | 07/10 |
| 513 | Item total | NO | 01/03 |
| 513 | Quantity total | NO | 01/03 |

Segment Descriptions
BPO - beginning segment (purchase order)
Purpose - to specify purchase order number and contract information.

Elements
| 1 | 100 | Purchase order number | manditory |
|---|---|---|---|
| 2 | 101 | Contract number | optional |
| 3 | 102 | Contract data | conditional |

Notes
If element 2 is used, element 3 is required.
NTE - note
Purpose - to provide additional unstructured information
Elements
| 1 | 124 | Note | manditory |
|---|---|---|---|

ITM - Item
Purpose - provide information on an item ordered
Elements
| 1 | 137 | Part number | manditory |
|---|---|---|---|
| 2 | 150 | Quantity | optional |

Notes
If element 2 is omitted, a quantity of 1 will be assumed.
LOC - Location
Purpose - specify a complete address for a location
Elements
| 1 | 245 | Street address | manditory |
|---|---|---|---|
| 2 | 246 | City | manditory |
| 3 | 247 | State | manditory |
| 4 | 248 | Zip Code | optional |

CTC - Contact
Purpose - specify a person to contact for additional information
Elements
| 1 | 311 | Name | manditory |
|---|---|---|---|
| 2 | 326 | Phone number | optional |

TTL - total
Purpose - to specify totals for transaction set
Elements
| 1 | 513 | Item total | manditory |
|---|---|---|---|
| 2 | 515 | Quantity total | optional |

Transaction Set

| BPO | begin purchase order | manditory 1 |
|---|---|---|
| NTE | note | float 2 |
| ITM | item | manditory 1 |
| LOC | location | manditory 1 |
| CTC | contact | optional 2 |
| TTL | totals | manditory 1 |

Transaction Behavior Set descriptions

First Set - checks validity of values in TTL segment. Two integer variables are used to store the accumulations. The behavior set variable bi1 is used to store the number of ITM segments. The behavior set variable bi2 is used to store the total quantity from the ITM segments.
BPO present - zero accumulation variables
(
bi0 = 0;

-continued
```
bi1 = 0;
)
ITM present
bi0 = bi0 + 1;           increment the ITM total
if (e_exist (2))         check if element 2 is present
  (
  bi1 = bi1 + e_int(2);  add value of quantity to total
  )
else
  (
  bi1 = bi1 + 1;         add assumed quantity to total
  )
)
TTL present
if (e_int(1) ! = bi1)    check ITM total
  (
  return (1);            return with failure code
  )
else if (e_exist (2))    check if quantity total is
  (                      present
  if (e_int (2) ! = bi2) check quantity total
    (
    return (2);          return with failure code
    )
  )
)
Second set - Performs translation from X12
segments to output file. The output is a block 1000
bytes long divided into sections, any unused bytes will
be zero.
Header section          0-40
                        0-4       purchase order
                        16-20     contract number
                        24-29     contract date
Note section            41-120
                        41-80     first note
                        81-120    second note
Item section            201-950   150 bytes per ITM
                        201-350   first item
                        351-500   second item
                        501-650   third item
                        651-800   fourth item
                        801-950   fifth item
Trailer section         951-999
                        951-960   item total
                        961-970   quantity total
                        971-976   conversion data
                        981-984   conversion time
Item layout             0-150     (relative offsets)
                        0-7       part number
                        8-10      quantity
                        11-30     street address
                        31-50     city
                        51-52     state
                        53-57     zip code
                        61-90     name 1
                        91-100    phone number 1
                        101-130   name 2
                        131-140   phone umber 2
Behavior variable usage
bi0      note index
bi1      item index
bi2      contact index
bi3      temp variable
bi4      temp variable
BPO present
(
if (!buffer (1000))      allocate a buffer of 1000 bytes
  (
  return (2);            return code for buffer failure
  )
bi0 = 0;                 zero note index and item index
bi1 = 0;
move (e_text (1),0);     place PO number
if (e_exist (2))         check for contract elements
  (
  move (e_text(2),16);   place contract number and data
  move (e_text(3),24);
  )
)
NTE present
(
```

-continued
```
bi3 = bi0 * 40 + 41;       set temp as offset for this note
move (e_text(1),bi3);      place note in proper slot
bi0 = bi0 + 1;             increment note index
)
ITM present
(
bi3 = bi1 * 100 + 201;     set temp as offset for this item
move (e_text(1), bi3);     place part number
if (e_exist(2))            check for quantity
  (
  move (e_text(2),bi3 + 8); place actual quantity
  )
else
  (
  move ("1",bi3 + 8);      place assumed quantity
  )
bi2 = 0;                   zero contact index
)
LOC present
(
move (e_text(1),bi3 + 11);place manditory elements
move (e_text(2),bi3 + 31);
move (e_text(3),bi3 + 51);
if (e_exist(4))            check for optional element
  (
  move (e_text(4), bi3 + 53) place optional zip code
  )
)
CTC present
(
bi4 = bi2 * 40 + 61;       set temp as offset for contact
move (e_text(1),bi4);      place manditory name
if (e_exist(2));           check for optional phone number
  (
  move (e_text(2), bi4 + 30); place optional phone
  number
  )
bi2 = bi2 + 1              increment contact index
)
TTL present
(
write (0,1024);            write the entire buffer to the
                           output file
)
```

| Input Transaction Set Example |
|---|
| BPO*4040a*1032*890101 |
| NTE*re seat modifications |
| ITM*104 |
| IDC*2121 Earth st.*Podunk*IL |
| CTC*Dave Nelson*5551212 |
| CTC*James Bond |
| ITM*227*4 |
| LOC*101 Anywhere*Keego Harbor*MI*48042 |
| ITM*3034*12 |
| IDC*PO Box 66*Los Angeles*CA |
| NTE*required by end of quarter |
| TTL*3*17 |

| Output File Example |  |  |  |
|---|---|---|---|
| 0   | 4040a        | 1032          | 890101 re seat mo |
| 50  | difications  |               | required by end of |
| 100 |              |               | quarter |
| 150 |              |               |  |
| 200 | 104  1       | 2121 Earth st | Podunk |
| 250 | IL           | Dave Nelson   |  |
| 300 | James Bond   |               |  |
| 350 | 227  4       | 101 Anywhere  | Keego Harbor |
| 400 | MI48042      |               |  |
| 450 |              |               |  |
| 500 | 3034 12      | PO Box 66     | Los Angeles |
| 550 |     CA       |               |  |
| 600 |              |               |  |
| 650 |              |               |  |
| 700 |              |               |  |
| 750 |              |               |  |
| 800 |              |               |  |
| 850 |              |               |  |
| 900 |              |               |  |
| 950 | 3            | 17  890104    | 0915 |

Summary

For each transaction set (document) there is a corresponding transaction set of translation instructions which embody transaction specific editing and validation logic such as described in TDCC's Volume 3 and Volume 4 as "special processing", as well as to cite specific translation requirements. This approach results in three powerful side benefits. First, virtually unlimited capability in terms of support for interface files. For example, flat files report images multiple relational files broadcast capability to route data to multiple sources and breakout capability and naming capability unique cases such as BIN files, etc.

Second, a very powerful capacity to upon receipt of unfamiliar transactions send an inquiry to the sender for the protocol specifications, then load the received protocol data into appropriate tables, and process the original transaction set. This feature could also be used as a service to trading partners for electronic distribution of protocol updates. Finally, there is an unlimited capability to perform data translation, context sensitive special processing and field level formatting, trimming, etc.

In producing an EDI transaction set (document) from one or more flat files, the first step is to determine the trading partner involved. This can be accomplished through file naming conventions, file directory location or an invocation parameter (this is configurable in the environmental data). Once the trading partner is determined the destination transaction set has probably been determined in the same manner. From this point forward, the transaction set end code instructions are processed in parallel with the transaction set definition itself. As previously mentioned, at block 46 of FIG. 9 the following functions are performed: (1) data element existence; (2) segment content against segment specification comparison; and (3) execution of segment behaviors specific to segment (without regard for usage).

The invention has been described in illustrative embodiments, but it will be evident to those skilled in the art that variations may be made from the foregoing teachings without departing from the scope of the following claims.

What is claimed is:

1. In an electronic information processing system including a pre-existing core program, EDI protocol data and protocol processing instruction data, a method for conforming input data into an output data structure, the method comprising the steps of:
    ascertaining, by the pre-existing core program in said system, an EDI protocol to be utilized in the system based on characteristics of the input data;
    selecting the EDI protocol data by the pre-existing core program, the EDI protocol data describing a syntax of the EDI protocol, the EDI protocol data including at least one data model;
    selecting the protocol processing instruction data by the pre-existing core program, the protocol processing instruction data including at least one layer of elements, the protocol processing instruction data describing trading partner specific editing and validation logic;
    initializing, in said system, the selected EDI protocol data related to the EDI protocol and protocol processing instruction data;
    linking, in the system, the initialized EDI protocol data and the initialized protocol processing instruction data to the pre-existing core program to form a data management engine; and
    converting, with the data management engine, the input data into the output data structure, the data management engine being dynamically configured based on the EDI protocol data, the protocol processing instruction data and the core program.

2. The method as claimed in claim 1 wherein the at least one layer of elements includes a first layer of data element descriptions and wherein the step of initializing includes the step of allocating memory for each data element description.

3. The method of claim 2 wherein the at least one layer of elements includes a second layer of segment descriptions and wherein the step of initializing includes the step of allocating memory for each segment description.

4. The method of claim 3 wherein the at least one layer of elements includes a third layer of transaction set descriptions and wherein the step of initializing includes the step of allocating memory for each transaction set description.

5. The method as claimed in claim 1 or 2 or 3 or 4 wherein the initialized protocol processing instruction data includes a layer of transaction behavior descriptions and wherein the step of initializing includes the step of allocating memory for each transaction behavior description.

6. The method of claim 4 wherein a first transaction set description includes a second transaction set description.

7. The method of claim 6 wherein a position of the second transaction set description represents semantic information.

8. The method of claim 6 wherein the absence of the second transaction set description represents semantic information.

9. The method as claimed in claim 1 wherein the step of initializing includes the step of allocating memory for a table of each of the layer elements.

10. The method as claimed in claim 1 wherein at least one of the layer elements has corresponding behaviors and wherein said step of initializing includes the step of allocating memory for a table for each of the layer elements and the corresponding behaviors.

11. The method as claimed in claim 9 or 10 wherein the step of initializing includes the step of providing a first set of control data to associate the layer elements including the tables of each of the layer elements.

12. The method as claimed in claim 11 wherein the step of converting includes the step of obtaining a second set of control data from a control data source of the system, the second set of control data being utilized to process the EDI protocol data with the input data.

13. In an electronic information processing system including a core program, EDI protocol data including at least one data and protocol processing instruction data describing trading partner specific editing and validation data, an apparatus for conforming input data into an output data structure, the apparatus comprising:
    means for ascertaining, in said system, an EDI protocol to be utilized in the system;
    means for selecting the EDI protocol data by the pre-existing core program;
    means for selecting the protocol processing instruction data by the pre-existing core program;

means for initializing, in said system, the selected EDI protocol data related to the EDI protocol and protocol processing instruction data;

means for linking, in the system, the initialized EDI protocol data and the initialized protocol processing instruction data to the pre-existing core program to form a data management engine, the data management engine converting the input data into the output data structure, the data management engine being dynamically configurable based on the EDI protocol data, the protocol processing instruction data and the core program.

* * * * *